Nov. 21, 1950 R. HENRY 2,531,042
PNEUMATIC COTTON HARVESTER
Filed Sept. 8, 1949 3 Sheets-Sheet 2
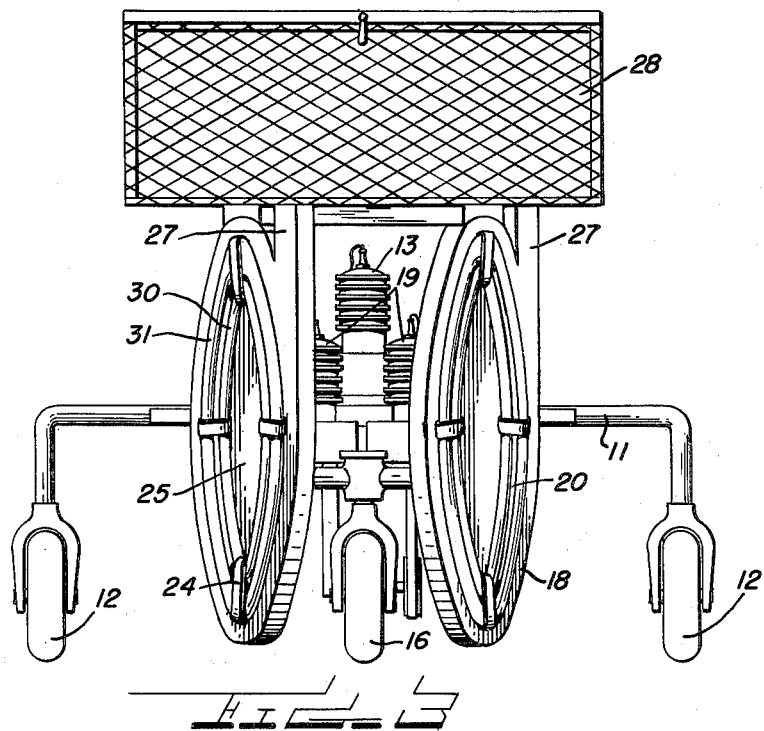
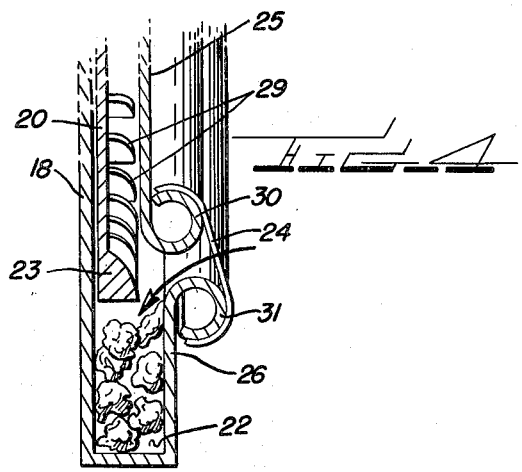
INVENTOR.
RAYMOND HENRY
BY
Merrill M. Blackburn
ATTORNEY

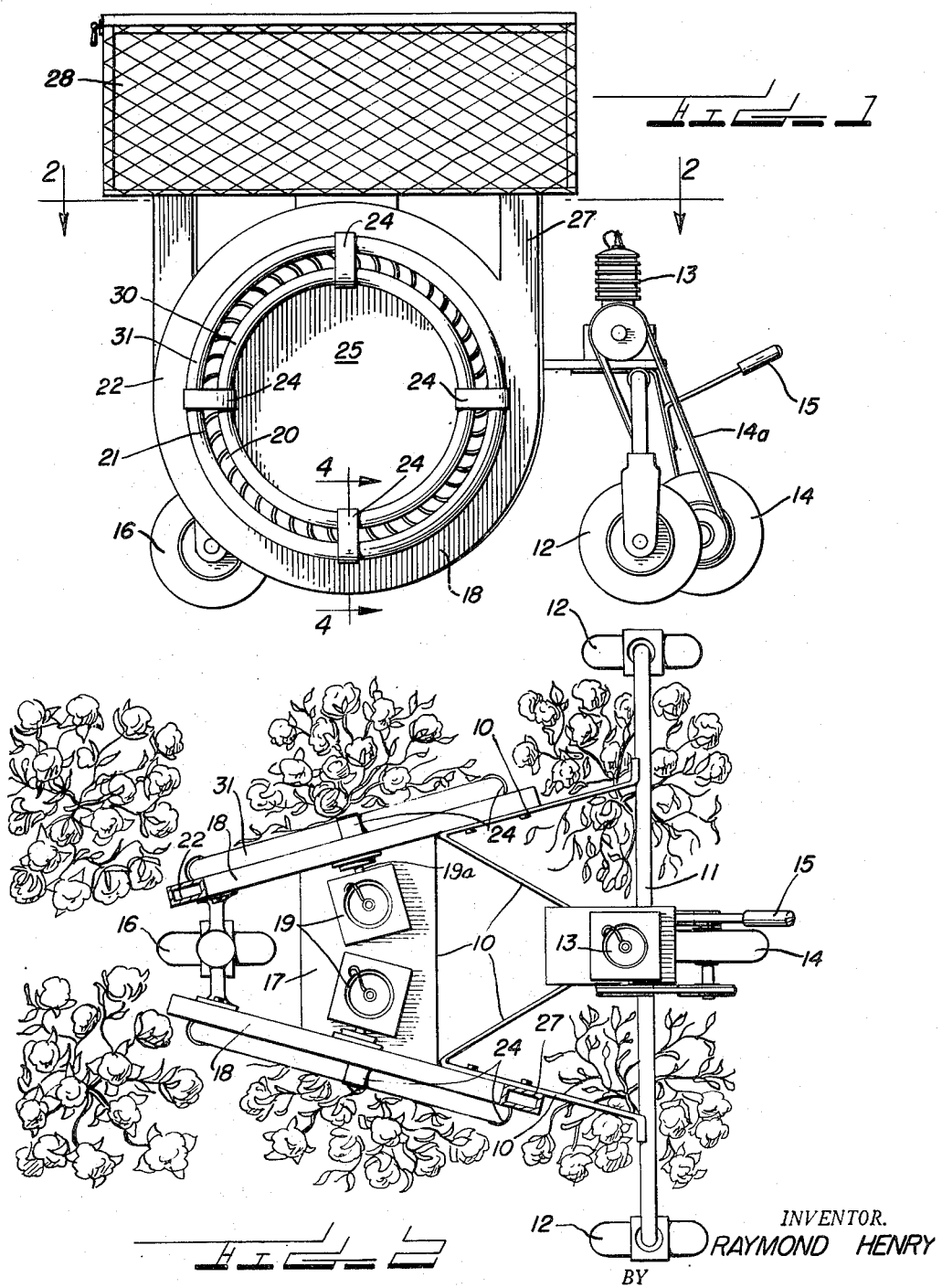

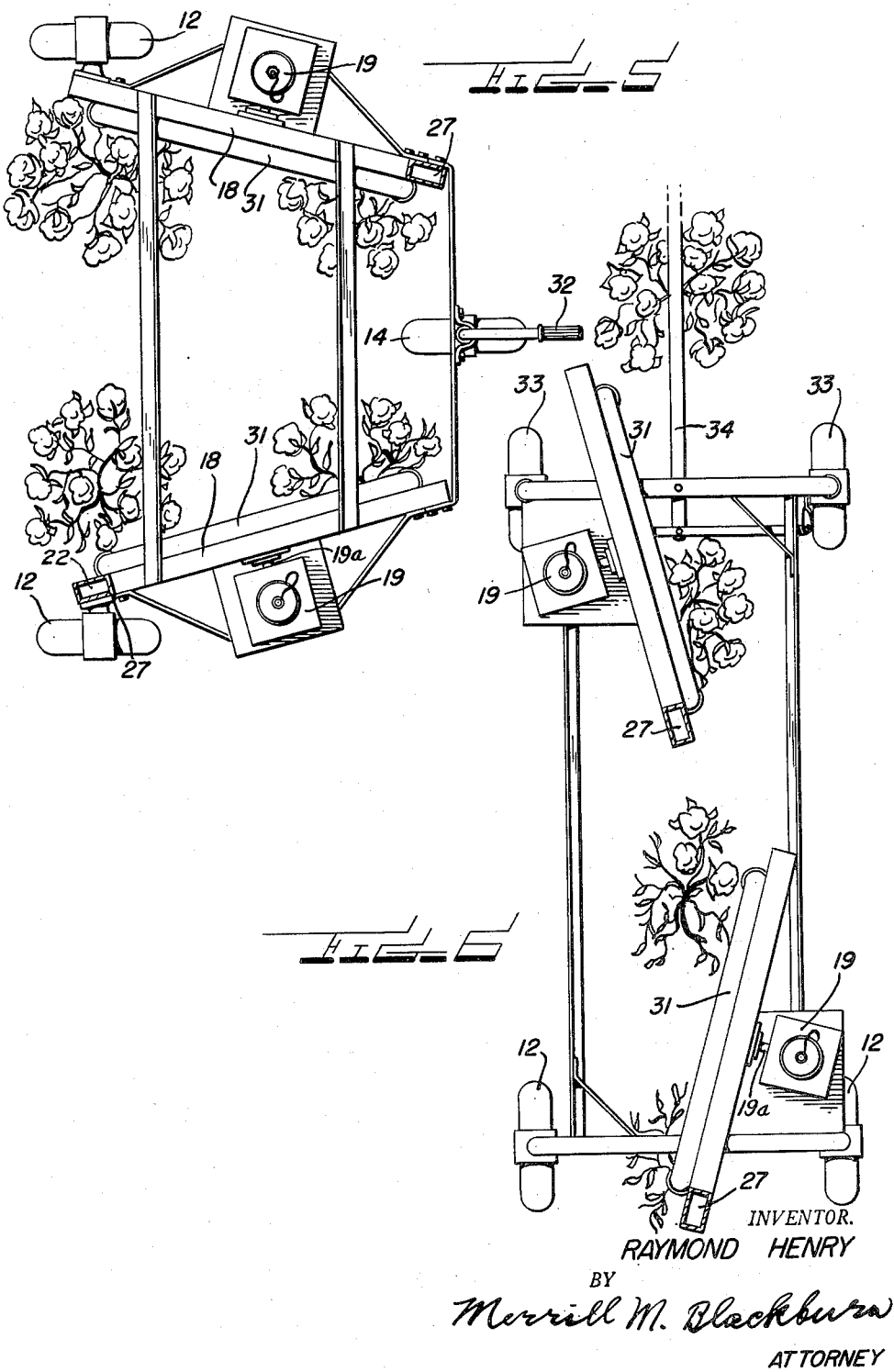

Patented Nov. 21, 1950

2,531,042

UNITED STATES PATENT OFFICE 2,531,042

PNEUMATIC COTTON HARVESTER

Raymond Henry, Moline, Ill.

Application September 8, 1949, Serial No. 114,577

8 Claims. (Cl. 56—12)

My present invention relates to means for increasing the rate of flow of air through the cotton bushes and into the collector. The purpose is not to produce a vacuum but to produce a high rate of movement of air through the bushes, whereby to pull the cotton out of the bolls and force it into a collector, shown as a wire mesh cage. An incidental object is to increase the rate at which cotton can be gathered. An additional object is to decrease the cost of harvesting the cotton crop. I have, also, such further objects, advantages, and capabilities as will hereafter appear and as are inherent in the structure disclosed herein. My invention further resides in the combination, construction, and arrangement of parts illustrated in the accompanying drawings and, while I have shown therein what is now regarded as the preferred embodiment of this invention, and a modification thereof, I desire the same to be regarded as illustrative only and not to be interpreted in a limiting sense.

In the drawings annexed hereto and forming a part hereof,

Fig. 1 is a side elevation of a machine embodying my present invention;

Fig. 2 is a plan view of such a machine in a cotton field, with parts removed;

Fig. 3 is a front elevation of the structure shown in Figs. 1 and 2;

Fig. 4 represents a fragmentary radial section of one of the wind-producing units, the section being taken substantially along the plane indicated by the line 4—4, of Fig. 1;

Fig. 5 is a plan view of a structure for picking cotton from two rows, simultaneously, embracing the two rows between the picking elements; and Fig. 6 represents a machine for picking the cotton from a single row at a time, picking first from one side of the row and then from the other side.

Reference will now be made in greater detail to the annexed drawings for a more complete description of this invention. In Figs. 1, 2, and 3, there is shown a somewhat skeletonized framework 10, connected at its rear end to an axle 11 upon which is mounted a motor 13, preferably an internal combustion motor, although I do not wish to exclude the use of other motive means for propelling the machine. For example, a storage or secondary battery may be mounted on the framework 10 and used to drive an electric motor whereby to drive the picker through the field.

At the outer ends of the axle 11 are mounted supporting wheels 12 which support the framework 10 and the axle 11 for transport through a field. The motor shown in Figs. 1 and 2 is represented as an internal combustion motor 13 which is shown as connected in driving relation to a ground-engaging wheel 14 which may be lifted out of ground-engaging position by means of a handle 15. The driving connection between the motor 13 and the ground-engaging wheel 14 is illustrated as a V-belt 14a, by preference.

At the front of the machine is shown a ground-engaging wheel 16 for supporting the front end of the framework 10 and the operative mechanism supported thereby. A platform 17, shown plainly in Fig. 2 but omitted in the other figures, is connected at its two ends to the framework 10 and serves to support the casings 18 and the motors 19, each provided with a motor shaft 19a by which the rotors 20 are rotated. These rotors are each mounted on an end of the shaft of a motor 19 and, by preference, are about forty inches (40") in diameter, which results in the speed at which the peripheral surface of the rotor travels being approximately one hundred and thirty (130) miles per hour. Each rotor 20 has a motor of its own so that blocking of an entrance for the air will not force a greater amount of air through another entrance and permit the easy closure of the partially blocked entrance.

In Fig. 1, the rotor 20 is seen through an opening 21 in the housing 18. This opening 21, in actual practice, is approximately five-sixteenths of an inch ($\frac{5}{16}$") in width which permits the cotton seeds to enter with the cotton, although it may be found, by further practice in the field, that some other size of opening may be preferable. The housing 18 has a peripheral channel 22 into which the cotton is forced by the rotor 20. The rotor is a cast plate, preferably of aluminum, with a large number of blades 23 which cause the air to enter through the opening 21, between the crossbars 24 which hold the plate 25 centered with relation to the face of the housing 18.

As stated above, the opening between the edge of the plate 25 and the surrounding flange 26 is approximately five-sixteenths of an inch ($\frac{5}{16}$") in width to permit passage of the cotton and its seeds. Likewise, the opening between the face of the rotor 20 and the flange 26 is approximately the same. The edges of the plate 25 and the flange 26 are rolled over, as shown at 30 and 31 in Fig. 4, to reduce friction to as small an amount as possible for the entering cotton.

The blades 23 force the air in the housing 18 out through the channel 27, thus causing the air to go into the basket 28. The edges of the blades 23 are rounded, as shown at 29 in Fig. 4, to assist in preventing the air from going out of the casing through the entrance slot.

The form of structure shown in Figs. 1 to 4 is adapted, as is evident from Fig. 2, to straddle two rows and pick from them simultaneously on the inside faces of the rows, while the structure of Fig. 5 straddles two rows and picks from them simultaneously on the outside of the rows. This structure can be guided in the field by turning the wheel 14 by means of the handle 32.

The structure of Fig. 6 is designed to pick on both sides of a single row, first on one side and then on the other. This structure is supported on two pairs of wheels 12 and 33, and these wheels are dirigible, after the manner of automobile wheels. This vehicle is towed by means of the tongue 34 which serves as a steering means, as in the case of a wagon or other trailing vehicle.

It is of course understood that the specific description of structure set forth above may be departed from without departing from the spirit of my invention as disclosed herein and as defined in the appended claims.

Having now described my invention, I claim:

1. A machine for picking cotton comprising, in combination, transporting means, a frame supported thereby, a platform on said frame, a plurality of power units mounted on said platform, a plurality of casings supported by said platform, a shaft extending from each of said power units into a casing, there being but one power unit to a casing, and a high speed rotary fan mounted coaxially on each shaft, said fans having outwardly extending blades around their outer parts, said casings having ring-shaped openings through one flat wall thereof concentrically placed with relation to the fans, so that, as the fans rotate, air is drawn into the casings to replace the air forced out by the blades of the fans, said casings having peripheral channels around the fans for reception of the air and cotton driven outwardly by the fans, the air being forced outwardly by the fans at such a velocity that the air entering the ring-shaped openings will carry along with it the cotton on the plants in a field.

2. A structure as defined by claim 1 having the casings spaced laterally from each other and inclined in a horizontal plane whereby to engage rows of cotton on opposite sides of the rows.

3. A structure as defined by claim 1 in which the casings have the central part omitted and a circular plate mounted in each space from which the central part is omitted, said circular plates being mounted centrically in said openings whereby to produce ring-shaped openings between the edges of the plates and the surrounding casing walls.

4. In a pneumatic cotton harvester having a plurality of supporting wheels and a supporting framework carried thereby; the improvements thereon consisting of a plurality of motors supported by said framework, and a flat casing in operative relationship to each motor, the casings being positioned at a small angle with relation to each other and spaced slightly laterally with regard to a central plane of the machine, whereby to engage opposite sides of bushes from which cotton is to be picked, said motors having shafts on which are mounted discs provided at their peripheries with blades parallel to their axes, the casings having peripheral channels surrounding the discs and their blades, said peripheral channels having discharge openings extending tangentially outwardly from the casings, and each casing having a lateral opening in one wall concentric with a motor shaft.

5. A structure as defined by claim 4 provided with a cotton catcher into which the cotton is blown by the discs.

6. A structure as defined by claim 4 provided with a drive wheel for propelling the picker in a field, and a motor for driving the propelling wheel.

7. A structure as defined by claim 4 in which the disc is driven at a speed to cause entrance of air into and exit thereof from the casing at a speed of at least one hundred and twenty (120) miles per hour.

8. In a pneumatic cotton harvester, a conveying vehicle, a motor supported thereby and provided with a substantially horizontal shaft, a casing carried by said vehicle, a high speed fan mounted on said shaft and rotating in a substantially vertical direction, said casing having a peripheral channel concentric with the fan, said picker having a cotton- receiving container for reception of cotton from the casing, a connection between the casing and the container for carrying the cotton from the one to the other, and means providing a narrow annular opening through one side of the casing opposite the lateral peripheral part of the fan through which air enters to replace air driven out through said connection, said air entering the casing by passing through the cotton on the bushes at a high enough rate of flow to remove the cotton from the bushes.

RAYMOND HENRY.

REFERENCES CITED

The following references are of record in the file of this patent:

UNITED STATES PATENTS

| Number | Name | Date |
|--------|------|------|
| 52,880 | Prall | Feb. 27, 1866 |
| 973,712 | Sewell | Oct. 25, 1910 |
| 1,496,395 | Vandiveer | June 3, 1924 |
| 1,751,376 | Watkins | Mar. 18, 1930 |
| 1,961,447 | Nisbet | June 5, 1934 |